United States Patent
Mian et al.

(10) Patent No.: US 9,454,816 B2
(45) Date of Patent: Sep. 27, 2016

(54) ENHANCED STEREO IMAGING-BASED METROLOGY

(71) Applicant: International Electronic Machines Corporation, Troy, NY (US)

(72) Inventors: Zahid F. Mian, Loudonville, NY (US); Ronald W. Gamache, East Greenbush, NY (US); Ryk E. Spoor, Troy, NY (US)

(73) Assignee: International Electronic Machines Corp., Troy, NY (US)

( * ) Notice: Subject to any disclaimer, the term of this patent is extended or adjusted under 35 U.S.C. 154(b) by 162 days.

(21) Appl. No.: 14/520,433

(22) Filed: Oct. 22, 2014

(65) Prior Publication Data

US 2015/0110350 A1    Apr. 23, 2015

Related U.S. Application Data

(60) Provisional application No. 61/961,769, filed on Oct. 23, 2013.

(51) Int. Cl.
*G06T 7/00* (2006.01)
*G08G 1/16* (2006.01)

(52) U.S. Cl.
CPC .......... *G06T 7/0022* (2013.01); *G06T 7/0075* (2013.01); *G08G 1/162* (2013.01); *G08G 1/166* (2013.01); *G08G 1/167* (2013.01); *G06T 2207/30236* (2013.01); *G06T 2207/30261* (2013.01)

(58) Field of Classification Search
None
See application file for complete search history.

(56) References Cited

U.S. PATENT DOCUMENTS

2010/0080447 A1*  4/2010  Kanazawa ........... G06K 9/6211
                                                        382/154
2012/0224033 A1    9/2012  Hayashi

FOREIGN PATENT DOCUMENTS

| JP | 2007047875 A | 2/2007 |
| JP | 2011123051 A | 6/2011 |
| KR | 101148029 B1 | 5/2012 |
| KR | 101227341 B1 | 1/2013 |

OTHER PUBLICATIONS

International Search Report for PCT Application No. US2014/061676, Jan. 20, 2015, 10 pages.

* cited by examiner

*Primary Examiner* — Siamak Harandi
*Assistant Examiner* — Amandeep Saini
(74) *Attorney, Agent, or Firm* — LaBatt, LLC

(57) ABSTRACT

A solution for evaluating an object using physical three-dimensional locations of the various points on the object derived from image data concurrently acquired by two or more cameras (e.g., stereo image data) is provided. Image data concurrently acquired by at least two cameras at each of multiple instants is processed to identify one or more points of an object visible in the image data. A physical three-dimensional location of each such point can be calculated at each instant using the corresponding image data. Additionally, a physical three-dimensional location of one or more points of the object visible only in the image data acquired by one camera can be calculated for each of the three different instants using the image data in which the corresponding point is visible and the physical three-dimensional location of one or more of the points visible in the image data acquired by at least two cameras.

20 Claims, 8 Drawing Sheets

ENHANCED STEREO IMAGING-BASED METROLOGY

REFERENCE TO RELATED APPLICATIONS

The current application claims the benefit of co-pending U.S. Provisional Application No. 61/961,769, titled "Enhanced stereo imaging and metrology method," which was filed on 23 Oct. 2013, and which is hereby incorporated by reference.

GOVERNMENT LICENSE RIGHTS

This invention was made with government support under contract no. DTRT57-12-C-10062 awarded by the U.S. Department of Transportation. The U.S. government has certain rights in the invention.

TECHNICAL FIELD

The disclosure relates generally to image-based metrology, and more particularly, to metrology using stereo imaging.

BACKGROUND ART

Current approaches for stereo imaging and metrology use template matching between the two stereo images. Template matching consists of selecting some region (template) of one image and, in effect, moving it around the other image until a sufficiently close match is found, at which point the two regions are assumed to be the same location seen from the two different cameras' perspectives. In the worst case scenario, every template-sized component of the first image must be compared with every portion of the second image. Even if there is some ability to restrict the processing region, such as use of the so-called epipolar imaging geometry, the general time involved with this procedure increases rapidly with the number of pixels in the image and template. In particular, the time increases as a factor of $n^2$, where $n^2=(n_i/n_t)^2$, and where $n_i$ is the total number of pixels in the image and $n_t$ is the total number of pixels in the template. For example, when a template is 10×10 pixels and the image is 1,000×1,000 pixels, the number of comparisons will be on the order of $(1,000,000/100)^2$, or 100,000,000 comparisons. A normal video rate is thirty frames per second, thereby requiring approximately three billion comparisons to be performed per second. Such a demand precludes processing stereo imagery in real-time using this approach with computing capabilities for currently available for many applications.

The resolution or accuracy of stereo metrology approaches is also limited. For example, they are highly dependent on the distance to the imaging cameras. This is due to the fact that an object of a given size subtends a smaller angle, and thus fewer pixels, at a greater distance. Therefore, for a single large object (such as a commercial vehicle), the accuracy of measurement may vary considerably from one part of an image to the next. Formally, the range to a point in object space is inversely proportional to the displacement in pixels (referred to as disparity) between the images of the object point in the pair of stereo images.

In addition, the current approach to stereo imaging and metrology also is dependent upon both cameras being able to see all interesting aspects of the target being measured. Components seen only by one camera cannot be measured using conventional stereo vision algorithms.

SUMMARY OF THE INVENTION

Aspects of the invention provide a solution for evaluating an object using physical three-dimensional locations of the various points on the object derived from image data concurrently acquired by two or more cameras (e.g., stereo image data). Image data concurrently acquired by at least two cameras at each of multiple instants is processed to identify one or more points of an object visible in the image data. A physical three-dimensional location of each such point can be calculated at each instant using the corresponding image data. Additionally, a physical three-dimensional location of one or more points of the object visible only in the image data acquired by one camera can be calculated for each of the three different instants using the image data in which the corresponding point is visible and the physical three-dimensional location of one or more of the points visible in the image data acquired by at least two cameras.

A first aspect of the invention provides a computer-implemented method of evaluating an object, the method comprising: for each of at least three different instants: concurrently acquiring first image data of the object using a first camera and second image data of the object using a second camera; a computer system processing the first and second image data to identify a shared point of the object visible in both the first and second image data; and the computer system calculating a physical three-dimensional location of the identified shared point using the first and second image data; the computer system calculating a physical three-dimensional location of an exclusive point of the object visible only in one of the first or second image data for each of the three different instants using the one of the first or second image data and the physical three-dimensional location of the shared point at each of the three different instants; and the computer system evaluating the object using the physical three-dimensional locations of the shared point and the exclusive point.

A second aspect of the invention provides a system comprising: a computer system for evaluating an object by performing a method comprising: obtaining image data including the object acquired at a plurality of instants, wherein the image data includes first image data and second image data concurrently acquired by a first camera and a second camera; for image data corresponding to at least three of the plurality of instants: processing the first and second image data to identify a shared point of the object visible in both the first and second image data; and calculating a physical three-dimensional location of the identified shared point using the first and second image data; calculating a physical three-dimensional location of an exclusive point of the object visible only in one of the first or second image data for each of the three different instants using the one of the first or second image data and the physical three-dimensional location of the shared point at each of the three different instants; and evaluating the object using the physical three-dimensional locations of the shared point and the exclusive point.

A third aspect of the invention provides a vehicle evaluation system comprising: a first camera and a second camera located over a path of travel for the vehicle with fields of view configured to capture image data including the front and top of the vehicle in both fields of view and each side of the vehicle in only one of the fields of view as the vehicle approaches the first and second cameras; and a computer system for evaluating the vehicle as it approaches a restricted-space region by performing a method comprising: obtaining image data including first image data and second image data of the vehicle concurrently acquired at a plurality of instants as the vehicle is approaching the first and second cameras; for image data corresponding to at least three of the plurality of instants: processing the first and second image data to identify a shared point of the vehicle visible in both the first and second image data; and calculating a physical three-dimensional location of the identified shared point using the first and second image data; calculating a physical three-dimensional location of an exclusive point of the vehicle visible only in one of the first or second image data for each of the three different instants using the one of the first or second image data and the physical three-dimensional location of the shared point at each of the three different instants; and evaluating the vehicle for passage through the restricted-space region using the physical three-dimensional locations of the shared point and the exclusive point.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The inventors propose a stereo imaging and metrology solution, which can address one or more deficiencies they have identified in current stereo imaging and metrology (e.g., measurement) approaches. Such deficiencies can include: a limited speed at which stereo imagery can be processed; an inability to recognize and measure targets not within both cameras' fields of view; a limited resolution accuracy achievable across the target or targets; and/or the like.

As indicated above, aspects of the invention provide a solution for evaluating an object using physical three-dimensional locations of the various points on the object derived from image data concurrently acquired by two or more cameras (e.g., stereo image data). Image data concurrently acquired by at least two cameras at each of multiple instants is processed to identify one or more points of an object visible in the image data. A physical three-dimensional location of each such point can be calculated at each instant using the corresponding image data. Additionally, a physical three-dimensional location of one or more points of the object visible only in the image data acquired by one camera can be calculated for each of the three different instants using the image data in which the corresponding point is visible and the physical three-dimensional location of one or more of the points visible in the image data acquired by at least two cameras.

As used herein, unless otherwise noted, the term "concurrently" means at the same instant or at substantially the same instant, such that the time difference is sufficiently small so as to not introduce an undesired amount of error into the corresponding data. In an embodiment, the time difference is less than 0.1 seconds. In a more particular embodiment, the time difference is less than 0.001 seconds. As used herein, unless otherwise noted, the term "set" means one or more (i.e., at least one) and the phrase "any solution" means any now known or later developed solution.

Figure 1:
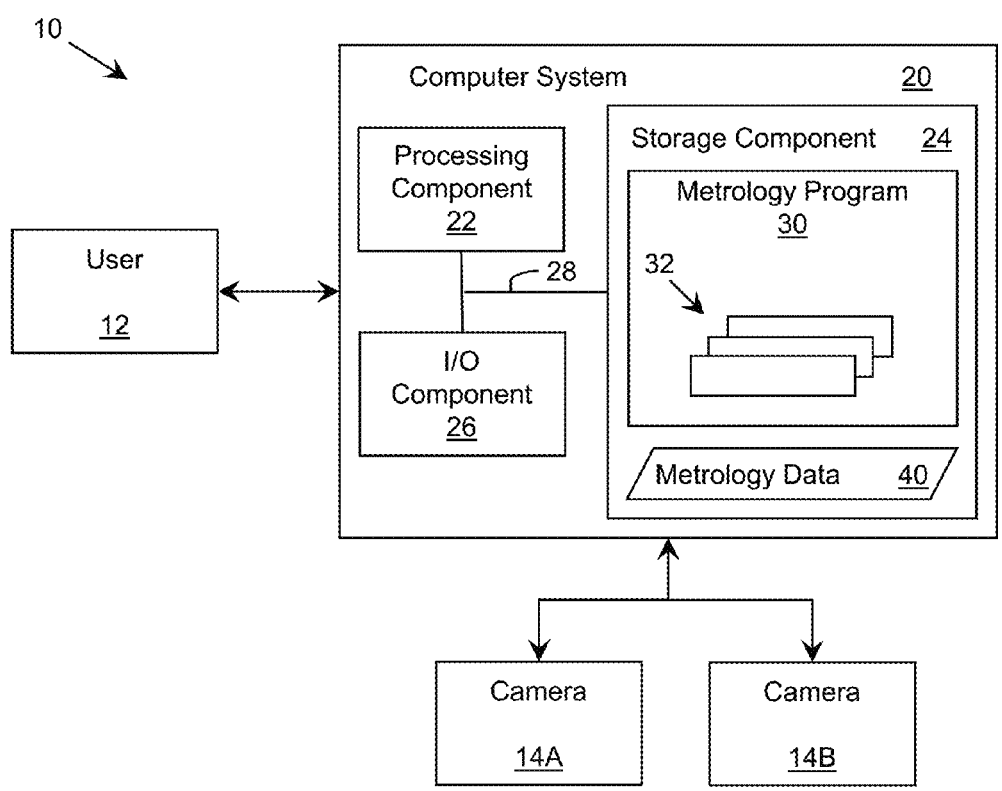
FIG. 1 shows an illustrative stereo imaging-based metrology environment according to an embodiment.

Turning to the drawings, FIG. 1 shows an illustrative stereo imaging-based metrology environment 10 according to an embodiment. To this extent, the environment 10 includes a computer system 20 that can perform a process described herein in order to process stereo image data to perform one or more of various metrological operations on one or more objects visible within the stereo image data. In particular, the computer system 20 is shown including a metrology program 30, which makes the computer system 20 operable to perform a set of metrological operations on an object visible within the stereo image data by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the metrology program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the metrology program 30 can manage a set of interfaces (e.g., graphical user interface(s), application program interface, and/or the like) that enable human and/or system users 12 to interact with the metrology program 30.

As illustrated, the I/O devices can include a pair of cameras 14A, 14B, which can be configured to concurrently acquire image data using any solution. While cameras 14A, 14B are described as illustrative imaging devices, it is understood that embodiments of the invention are not limited to any particular solution utilized for acquiring image data. Regardless, the image data can be provided for processing by the computer system 20. The computer system 20 can store the image data and/or additional data relating thereto as metrology data 40. Furthermore, the computer system (e.g., as enabled by the metrology program 30) can manage (e.g., store, retrieve, create, manipulate, organize, present, etc.) the data, such as metrology data 40, using any solution.

In any event, the computer system 20 can comprise one or more general purpose computing articles of manufacture (e.g., computing devices) capable of executing program code, such as the metrology program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the metrology program 30 can be embodied as any combination of system software and/or application software.

Furthermore, the metrology program 30 can be implemented using a set of modules 32. In this case, a module 32 can enable the computer system 20 to perform a set of tasks used by the metrology program 30, and can be separately developed and/or implemented apart from other portions of the metrology program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the metrology program 30 fixed thereon (e.g., one or more modules 32). However, it is understood that the computer system 20 and the metrology program 30 are only representative of various possible equivalent computer systems that may perform a process described herein. To this extent, in other embodiments, the functionality provided by the computer system 20 and the metrology program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

While the system environment 10 is shown including a computer system 20 and a pair of cameras 14A, 14B, it is understood that the cameras 14A, 14B and computer system 20 can be implemented separately from one another. For example, another system can acquire data from the cameras 14A, 14B, which is provided for evaluation by the computer system 20. To this extent, the computer system 20 can be utilized to process image data from multiple pairs of cameras 14A, 14B, which can be located at a single location or multiple disparate locations.

Figure 2:
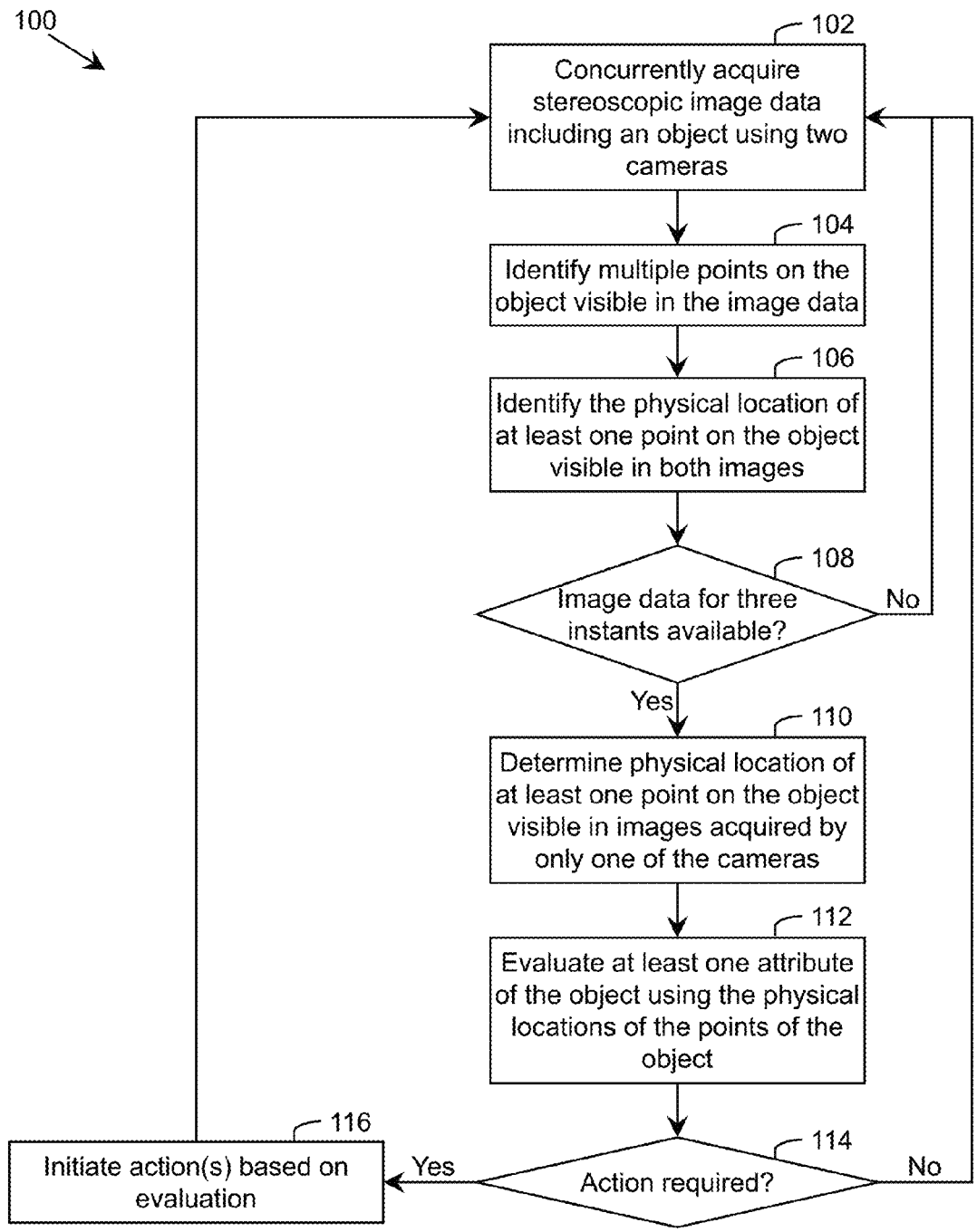
FIG. 2 shows an illustrative process for evaluating an object using stereoscopic image data according to an embodiment.

As discussed herein, the metrology program 30 enables the computer system 20 to perform one or more metrological operations using image data, such as image data acquired by the cameras 14A, 14B. FIG. 2 shows an illustrative process 100 for evaluating an object using stereoscopic image data according to an embodiment, which the metrology program 30, when executed, can cause the computer system 20 to implement. While the process 100 is shown including a series of sequential actions for clarity, it is understood that the computer system 20 can perform the actions in any order, perform actions in parallel, perform fewer or additional actions, and/or the like, consistent with embodiments of the invention described herein.

Referring to FIGS. 1 and 2, in action 102, the image data can be concurrently acquired by the cameras 14A, 14B. Furthermore, the cameras 14A, 14B can have at least partially overlapping fields of view at a target distance from the cameras 14A, 14B. In this case, the image data acquired by the cameras 14A, 14B can provide stereo image data for object(s) visible within some or all of the image data acquired by the cameras 14A, 14B.

Figure 3:
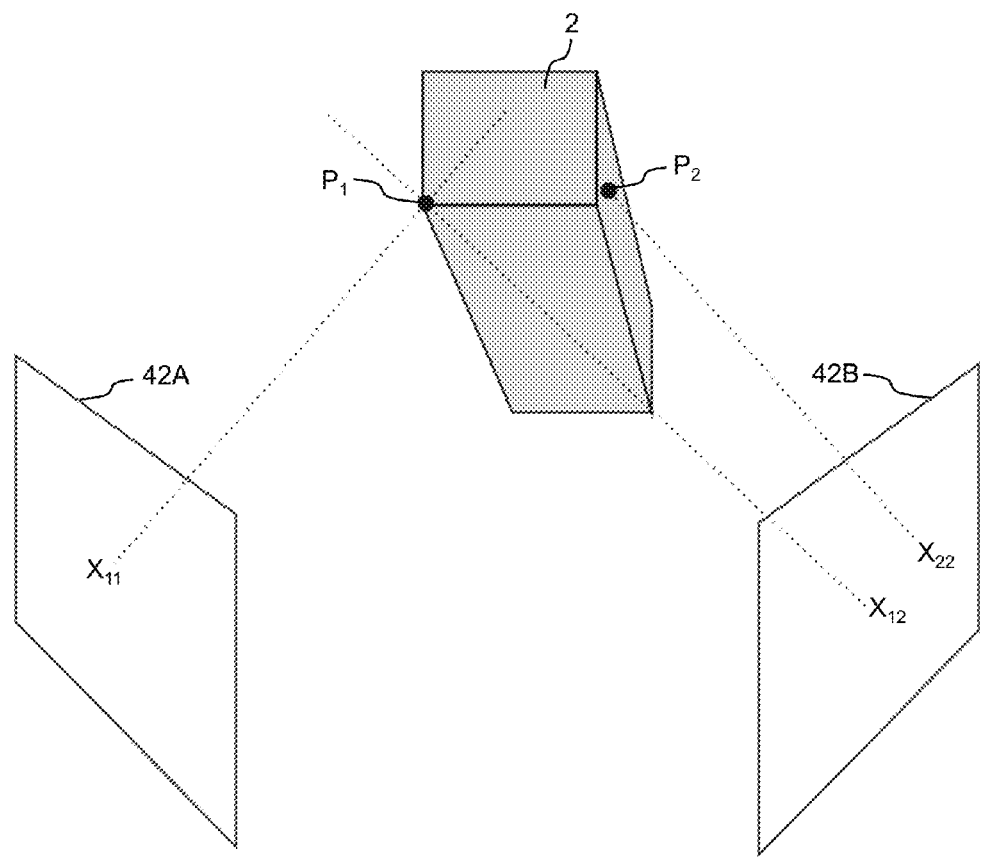
FIG. 3 shows an illustrative stereo imaging approach according to an embodiment.

To this extent, FIG. 3 shows an illustrative stereo imaging approach according to an embodiment. As illustrated, an object 2 is imaged by cameras (e.g., cameras 14A, 14B of FIG. 1) having image planes 42A, 42B. In an embodiment, the image planes 42A, 42B are aligned such that the corresponding fields of view and intersections thereof are well known, or co-registered. Such alignment can be performed using any solution.

In action 104 (FIG. 2), the computer system 20 (FIG. 1) can identify multiple points on an object 2 visible in some or all of the image data using any solution. For each image plane 42A, 42B, a corresponding point on the object 2 will appear in a location of the image plane 42A, 42B along the corresponding line of sight between the point on the object 2 and the image plane 42A, 42B. For example, point $P_1$ on the object 2 will appear at location $X_{11}$ in the image plane 42A and location $X_{12}$ in the image plane 42B based on the corresponding lines of sight (indicated by the dashed lines in FIG. 3). Since the lines of sight for point $P_1$ and the image planes 42A, 42B intersect at a unique physical location within the three-dimensional physical space (object space) imaged by the cameras 14A, 14B, in action 106 (FIG. 2), the computer system 20 (FIG. 1) can determine an actual physical location of the point $P_1$ within the three-dimensional physical space using image data corresponding to the image planes 42A, 42B, which is acquired concurrently by the cameras 14A, 14B.

Typically, some portions of the object 2 will not be present in the image data corresponding to both image planes 42A, 42B. For example, point $P_2$ on the object 2 will appear at location $X_{22}$ in image plane 42B based on the corresponding line of sight, but will not appear in image plane 42A as the line of sight is blocked by other portions of the object 2. In this case, an actual physical location of the point $P_2$ in three-dimensional space cannot be determined using image data corresponding to the image planes 42A, 42B and standard stereo imaging approaches.

Regardless, an accuracy with which the computer system 20 can determine the physical location of the point $P_1$ will depend, for example, on the distance between the image planes 42A, 42B, the resolution of the image data, and/or the like. It is understood that an embodiment can be implemented to provide any desired degree of accuracy, which can be selected based on the corresponding application for the embodiment using any solution.

The locations in the image planes 42A, 42B where the locations $X_{11}$ and $X_{12}$ fall due to the point $P_1$ are a function of various extrinsic and intrinsic parameters of the imaging system. These parameters include: the physical three-dimensional locations and orientations of the image planes 42A, 42B in a coordinate system corresponding to the point $P_1$; a pixel size/resolution of the corresponding image data (e.g., inches or centimeters/pixel); the focal length of the lens of the imaging device, which causes the two dimensional location in the image plane 42A, 42B to be a function not only of the location of the point $P_1$, but also the distance to the point $P_1$; and the like.

The parameters can be expressed as a matrix C of constants. Each camera 14A, 14B will have a corresponding projection matrix $C^1$, $C^2$. The matrixes $C^1$, $C^2$ and the corresponding constants can be derived during calibration of the cameras 14A, 14B. For each camera 14A, 14B, using homogeneous coordinates, the location of an image point $x_1 y_1$ and a real world point P is related by:

$$[x_1\ y_1\ 1]^{T=C[P_X\ P_Y\ P_Z\ 1]^T} \quad (1)$$

where C is a 3×4 matrix of constants derived from a least squares minimization during calibration. For example, calibration can include presenting a target for imaging by the cameras 14A, 14B at a number of locations and orientations. The constants capture the six degrees of freedom extrinsic transformation between the two cameras 14A, 14B, and intrinsic for each camera 14A, 14B (e.g. focal length, location of center pixel with respect to the optical axis, pixel size, lens distortion, and orientation and location of the image plane) with respect to the optical axis of each camera 14A, 14B. Once known, the computer system 20 can use these coefficients to transform points, such as point $P_1$, in the image space to physical locations in the three-dimensional physical space.

For a point P that is present in the image data of both cameras 14A, 14B, there are two sets of image points [x1 y1 1], [x2 y2 1], which are projections of the single physical location [PX PY PZ 1]. With known x, y values in the image data concurrently acquired by both of the cameras 14A, 14B, the computer system 20 can solve for PX, PY, PZ.

For example, the computer system 20 can perform matrix multiplications on the two equations, one for each image point in the image data captured by each camera 14A, 14B, to obtain the following equation:

$$\begin{bmatrix} x_1 c_{31}^1 - c_{11}^1 x_1 c_{32}^1 - c_{12}^1 x_1 c_{33}^1 - c_{13}^1 \\ y_1 c_{31}^1 - c_{21}^1 y_1 c_{32}^1 - c_{22}^1 y_1 c_{33}^1 - c_{23}^1 \\ x_2 c_{31}^2 - c_{11}^2 x_2 c_{32}^2 - c_{12}^2 x_2 c_{33}^2 - c_{13}^2 \\ y_2 c_{31}^2 - c_{21}^2 y_2 c_{32}^2 - c_{22}^2 y_2 c_{33}^2 - c_{23}^2 \end{bmatrix} \begin{bmatrix} X \\ Y \\ Z \end{bmatrix} = \begin{bmatrix} c_{14}^1 - x_1 c_{34}^1 \\ c_{24}^1 - y_1 c_{34}^1 \\ c_{14}^2 - x_2 c_{34}^2 \\ c_{24}^2 - y_2 c_{34}^2 \end{bmatrix}$$

The equation is in a general matrix form AX=B, where A is the left side of the question, B is the right side of the equation, and X is the three-dimensional physical location to be solved for in terms of the two camera projection matrixes $C^1$, $C^2$ and the two image points, $x_1 y_1$, $x_2 y_2$. After some matrix manipulation, a solution can be expressed as:

$$X=(A^T A)^{-1} A^T B \quad (2)$$

where T denotes the transpose matrix operation and −1 denotes the inverse matrix operation.

Figure 4:
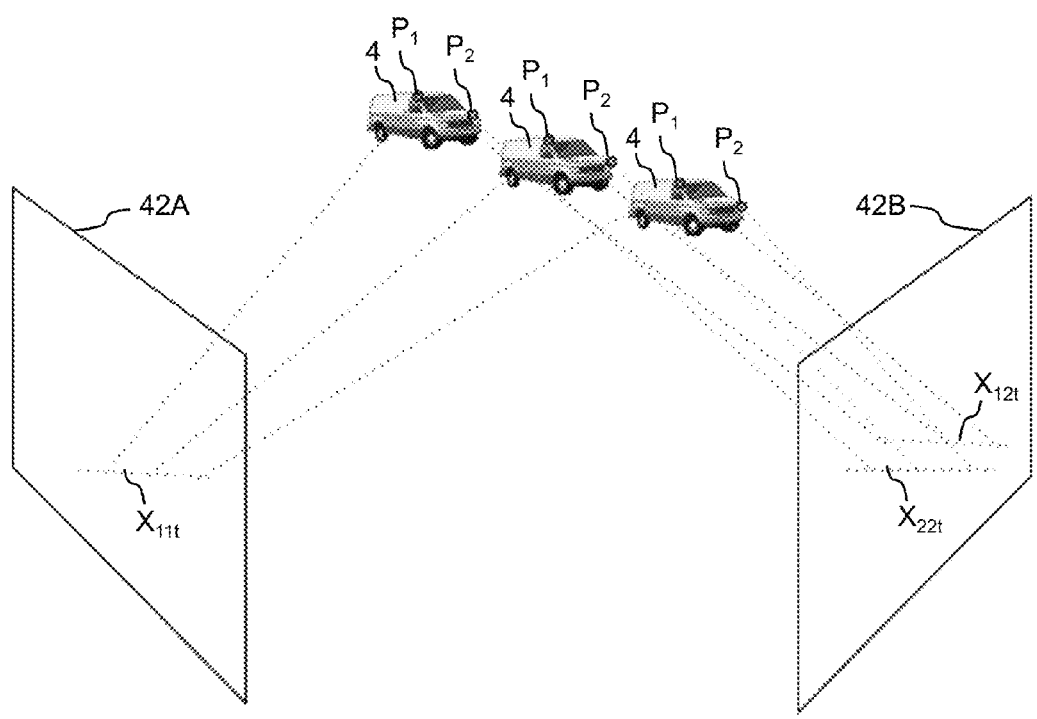
FIG. 4 shows an illustrative stereo imaging approach for a moving object according to an embodiment.

The computer system 20 can determine the physical location of a point $P_1$ on the object 4 visible over multiple images concurrently acquired by both the cameras 14A, 14B. FIG. 4 shows an illustrative stereo imaging approach for a moving object 4 according to an embodiment. In this case, the cameras 14A, 14B (FIG. 1) are acquiring image data having the image planes 42A, 42B at a frame rate sufficient to capture multiple images of the moving object 4 while it remains within the fields of view of the cameras 14A, 14B. FIG. 4 illustrates three such positions of the object 4, although it is understood that these positions are only illustrative. Similarly, two illustrative points $P_1$, $P_2$ are shown on the object 4. Point $P_1$ is visible in the fields of view of both cameras 14A, 14B (e.g., both image planes 42A, 42B), while point $P_2$ is only visible in the field of view of one camera 14B (e.g., image plane 42B).

As illustrated by the different lines of sight (dashed lines) for each point $P_1$, $P_2$, as the object 4 moves within the physical area being imaged and is concurrently imaged by the cameras 14A, 14B at the three different instants, $t_1$, $t_2$, $t_3$, the apparent position of the object 4 in the image planes 42A, 42B, and therefore the apparent positions of the points $P_1$, $P_2$, can change. Over time, the changes can create paths $X_{11t}$, $X_{12t}$, $X_{22t}$, along the image planes 42A, 42B for the points $P_1$, $P_2$. It is understood that while each path $X_{11t}$, $X_{12t}$, $X_{22t}$ is shown as being linear, this need not be the case and a path can include any number of turns in any direction. However, in an embodiment, the frame rates utilized by the cameras 14A, 14B are such that, for any three consecutively acquired image data, the points $P_1$, $P_2$ on the object 4 can be approximated as having a linear relationship to a sufficient degree of certainty for the application. For example, for vehicles traveling at highway speeds (e.g., approximately 70 miles per hour or 110 kilometers per hour) and cameras 14A, 14B capable of acquiring images at thirty frames per second, three consecutive images acquired by the cameras 14A, 14B would correspond to approximately six feet (two meters) of total motion by the vehicles, which can be assumed to be a straight line with a sufficient degree of accuracy.

For each of the three sets of concurrently acquired image data, the computer system 20 can determine an actual physical location of the point $P_1$ within the three-dimensional space using the image data using any solution, e.g., a stereo imaging-based metrology solution described herein. In an embodiment, the computer system 20 also can identify an actual physical location of the point $P_2$ within the three-dimensional space using the image data acquired at three different instants, which can be three consecutive frames or three frames acquired within a sufficiently small period of time to enable assumption that the three points will fall in a straight line.

To this extent, in action 108 (FIG. 2), the computer system 20 can determine whether image data including the object 4 and the corresponding point $P_2$ (visible in the image data acquired by only one camera 14A, 14B) is available for three instants of time. If so, in action 110 (FIG. 2), the computer system 20 can determine the physical location of the point $P_2$ using the image data.

To determine the actual physical locations of point $P_2$ within the three images, there are nine parameters (degrees of freedom), $<X_1Y_1Z_1X_2Y_2Z_2X_3Y_3Z_3>$, which correspond to the three dimensional physical location of the point $P_2$ at the instant at which each of the three images was acquired. In an embodiment, the computer system 20 can assume that Z is along a direction of travel for the object 4, X is horizontally transverse to the direction of travel, and Y is up/down. Using these assumptions, the calculations required to be performed by the computer system 20 can be simplified. However, it is understood that the computer system 20 can implement analogous analyses for any choice of coordinate system as the physical reality will not change.

In general, there are not sufficient equations relating the nine parameters to known information to develop a solution. In an embodiment, the computer system 20 (FIG. 1) uses a set of assumptions concerning the relationship between points $P_1$ and $P_2$ in three successive image frames acquired for the image plane 42B in order to reduce the number of unknown parameters. For example, the computer system 20 can assume that the object 4 is a rigid body, therefore, a physical relationship between points $P_1$, $P_2$ will not change between image frames.

The object 4 may have inter-frame XY motion (using the coordinate system described above), e.g., due to a travel surface (e.g., roadway) that is not flat or level, movement of the vehicle transverse to the direction of travel (e.g., to change lanes), and/or the like. To this extent, the computer system 20 can quantify the inter-frame XY motion of the point $P_2$ to account for such motion by the object 4. In an embodiment, the computer system 20 can determine the inter-frame XY motion of the point $P_1$ (dx, dy) using the stereo image data and, based on the rigid body assumption, the inter-frame XY motion of the point $P_2$ can be assumed to be the same (dx, dy). Such an assumption is most accurate when the travel surface of the object 4 is sufficiently uniform (e.g., flat pavement).

The computer system 20 can calculate a speed at which the object 4 is traveling using any solution. For example, using the stereo image data, the computer system 20 can calculate a speed, $v_t$, for point $P_1$ using the stereo image data for two image frames acquired at instants $t_1$, $t_2$ using the formula: $v_t = (Z_{1t2} - Z_{1t1})/(t_2 - t_1)$, where $(t_2 - t_1)$ is the time between the image frames and the $Z_1$ terms are the Z components of the physical location of point $P_1$ as determined by the computer system 20 from each stereo pair of image frames. Using a previous Z term of point $P_2$ at a given instant, t, and the calculated velocity, the computer system 20 can determine the Z term of point $P_2$ for a given image frame acquired at a subsequent instant, t+1, by the equation: $Z_{2(t+1)} = Z_{2t} + v_{(t1 \to t2)}$.

In light of the above assumptions and information acquired from the stereo image frames, the nine parameters for the physical locations of point $P_2$ in each of the three image frames has been reduced to three unknown parameters, $Px_0$, $Py_0$, $Pz_0$, which correspond to the three-dimensional physical location of the point $P_2$ in the first image frame. Therefore, the computer system 20 can use a system of three equations to relate three sets of image points $P_2$ in the single image data 42B to the three unknowns. For example, the computer system 20 can use the following equations:

$$[x_1\ y_1\ 1]^T = C^2[P_{X0}\ P_{Y0}\ 1]^T$$

$$[x_2\ y_2\ 1]^T = C^2[(P_{x0}+dx)(P_{Y0}+dy)P_{z1}\ 1]^T$$

$$[x_3\ x_3\ 1]^T = C^2[(P_{x0}+2*dx)(P_{Y0}+2*dy)P_{z2}\ 1]^T$$

As a result, the computer system 20 can recover the three-dimensional physical locations of a point $P_2$ only visible in the image data 42B using the assumptions and data described herein. For example, the computer system 20 can solve the equations above for the unknown components of $P_2$ using a solution similar to equation (2). By combining stereo vision and video processing to estimate the dimensions of a rigid body when some features are occluded from one camera, the computer system 20 can solve a problem which has challenged stereo imaging approaches for many years. Such a solution can be important in successfully implementing solutions for a number of applications.

In a typical application, in action 112 (FIG. 2), the computer system 20 can evaluate one or more attributes of the object using the physical locations of the points $P_1$, $P_2$ identified on the object. For example, the computer system 20 can determine some or all of the dimensions of the object. The dimension(s) can enable the computer system 20 to perform one or more additional evaluations of the object. Regardless, in action 114 (FIG. 2), the computer system 20 can determine whether any action is required to be taken in response to the evaluation. If so, in action 116 (FIG. 2), the computer system 20 can initiate and/or perform the required action(s). In either case, the process can return to acquiring and processing image data in action 102 (FIG. 2). As discussed herein, in an embodiment, the computer system 20 is capable of performing the process 100 in real time to perform a real time evaluation of objects, such as objects moving through the imaged region, and initiate/perform action(s) based on the evaluation in real time.

Additional aspects of the invention are further described in conjunction with an illustrative application. In particular, the computer system 20 (FIG. 1) uses stereo-imaging based metrology to determine dimensions of vehicles traveling along a roadway in real time. The determined dimensions can be used to identify potential problem vehicles. For example, stereo image data can be acquired at a point in a roadway located some distance before a location of concern in the roadway having a low clearance, narrowed travel area, and/or the like. Such a location of concern may be a permanent location in the roadway or a temporary location, e.g., due to construction being performed on or near the roadway. In this case, the stereo-imaging based metrology can verify that the dimensions of the vehicles, particularly commercial vehicles, will allow their safe travel through the location of concern. Additionally, the stereo-imaging based metrology can result in actions being initiated in the event that a vehicle is identified as being too large to safely travel through the location of concern.

Figure 5A:
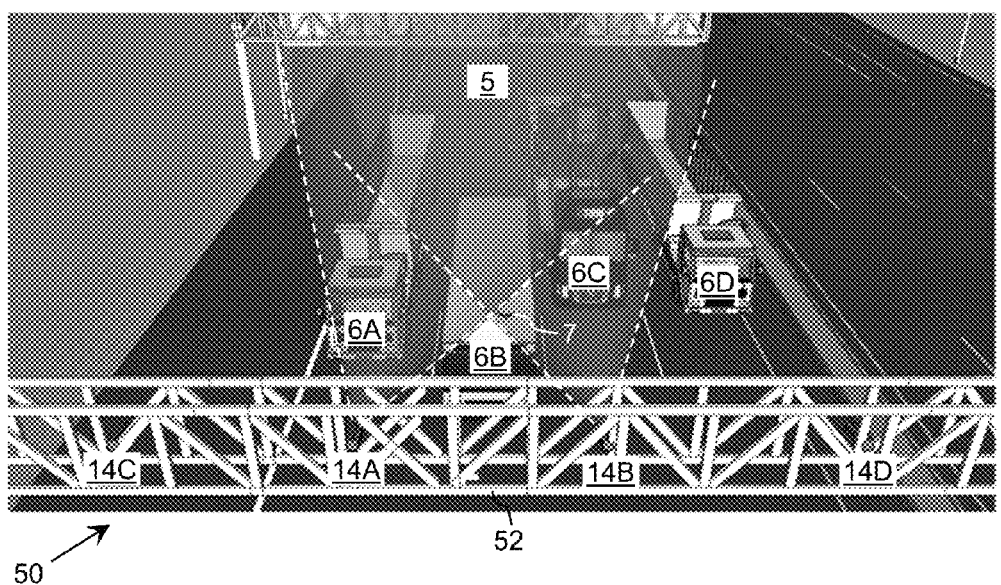
FIGS. 5A and 5B show top and side views, respectively, of a vehicle evaluation system according to an embodiment.
Figure 5B:
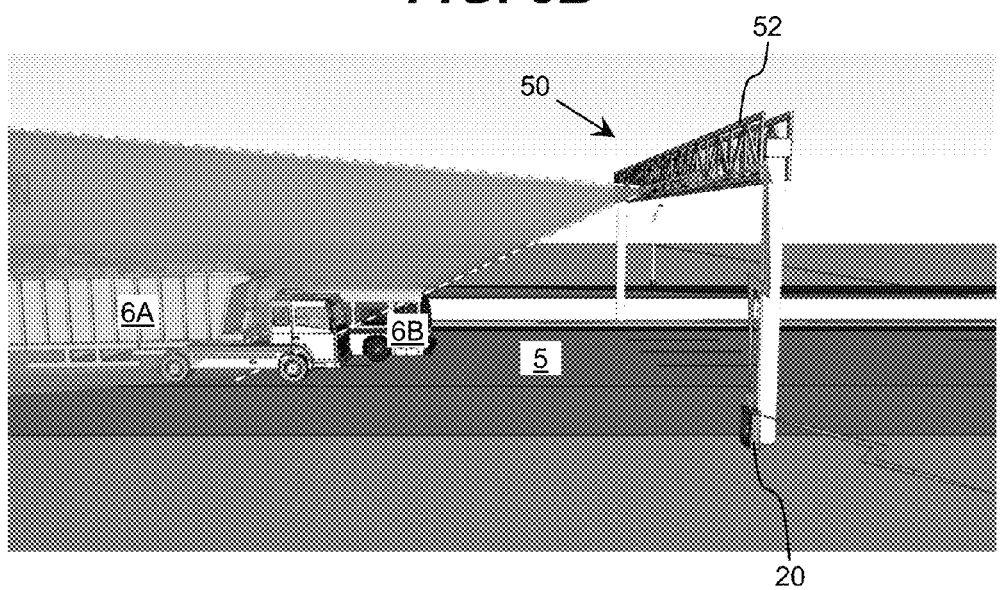

FIGS. 5A and 5B show top and side views, respectively, of a vehicle evaluation system 50 according to an embodiment. In this case, four cameras 14A-14D are shown located on a gantry 52 above a roadway 5. The cameras 14A-14D can be affixed to the gantry 52 using any solution. The cameras 14A-14D are mounted in a manner to enable the cameras 14A-14D to acquire image data of vehicles 6A-6D traveling along the roadway 5 as they approach the gantry 52. However, it is understood that this is only illustrative, and the cameras 14A-14D can be configured to acquire image data from any combination of view points with respect to the roadway 5 and vehicles 6A-6D, including as the vehicles 6A-6D travel away from the gantry 52, from a side of the roadway 5, and/or the like.

In an embodiment, the system 50 includes cameras which are located in a manner to acquire stereo image data of opposing sides of an object (e.g., vehicle) as it is traveling. For example, the system 50 can include a camera 14A-14D mounted substantially above each boundary of the designated lanes of travel on the roadway 5. In this case, the system 50 can include one additional camera 14A-14D than the number of lanes of travel on the roadway 5 (e.g., five cameras to cover four lanes of travel). The computer system 20 can use image data acquired by each end camera, such as camera 14C, to evaluate vehicles, such as vehicle 6A, traveling in the corresponding outer lanes of travel, while the computer system 20 can use image data acquired by each interior camera, such as cameras 14A, 14B, and 14D, to evaluate vehicles traveling in the two adjacent designated lanes of travel. To this extent, the computer system 20 can use image data acquired by the camera 14A to evaluate both the vehicles 6A, 6B; image data acquired by the camera 14B to evaluate both the vehicles 6B, 6C; and image data acquired by the camera 14D to evaluate both the vehicles 6C, 6D.

However, it is understood that the system 50 can include any number of cameras 14A-14D. For example, in some applications or to address certain situations, such as when a vehicle is extremely wide, vehicles may be crossing between lanes as they pass the cameras 14A-14D, and/or the like, the system 50 can also include a camera located above the centerline of each designated travel lane of the roadway 5. Inclusion of these cameras can help ensure that image data including the outer sides of each vehicle 6A-6D is available for the computer system 20 to process. In an embodiment, the computer system 20 includes an ability to evaluate and change the cameras 14A-14D from which image data is utilized to evaluate a vehicle 6A-6D, such as a vehicle that is changing lanes. For example, for a vehicle located along the centerline of the travel lanes occupied by the vehicles 6B, 6C, the computer system 20 can use image data acquired by cameras 14A, 14D to evaluate the vehicle.

In an embodiment, the cameras 14A-14D are configured to concurrently acquire image data capable of being processed by the computer system 20 to evaluate the vehicles 6A-6D in various operating conditions (e.g., day or night, fog, rain, sunshine, etc.). To this extent, the system 50 can include cameras 14A-14D, which concurrently acquire image data having sufficient resolution and having a sufficient frame rate using any solution. Furthermore, the cameras 14A-14D can generate image data based on radiation within any combination of one or more regions of the electromagnetic spectrum, including visible light, infrared, near infrared, and/or the like. Similarly, a camera 14A-14D can use a radar imaging solution to generate image data.

Additionally, it is understood that the system 50 can include one or more additional components, depending on the application and operating environment. To this extent, the gantry 52 can support additional components, such as one or more illuminators, one or more vehicle sensors, and/or the like. When included, the illuminators can be separate devices or integrated with the cameras 14A-14D. In a more particular embodiment, the cameras 14A-14D are camera/illuminator units, each of which includes a near infrared camera (such as WATEC 902HS camera) coupled with a near infrared light emitting diode illuminator (such as the IR-25 illuminator available from SuperCircuits). Regardless, the cameras 14A-14D, and any other components included in the system 50, can be in communication (e.g., wired and/or wireless) with a computer system 20, which is shown located adjacent to the gantry 52 in FIG. 5B.

However, it is understood that the computer system 20 can be located anywhere with respect to the cameras 14A-14D, including remotely located therefrom, integrated therewith, and/or the like.

Considering the cameras 14A, 14B as an illustrative pair of cameras for purposes of further discussion (which equally applies to all pairs of the cameras 14A-14D), the cameras 14A, 14B have overlapping fields of view as indicated by the dashed lines in FIGS. 5A and 5B. The fields of view allow for stereo imaging in the region in which the fields of view overlap, which is configured (e.g., during calibration) to include areas located along one or more lanes of travel of the roadway 5. As described herein, the cameras 14A, 14B can be mounted substantially above the boundaries of the designated lanes of travel on the roadway 5. In this case, vehicles, such as the vehicle 6B, will generally pass through the overlapping area of the fields of view of the cameras 14A, 14B and be imaged in stereo. However, as can be seen, numerous portions of the vehicle 6B will be visible only in the image data acquired by one camera 14A, 14B, but not both.

In an embodiment, the computer system 20 processes the image data acquired by cameras 14A, 14B to determine the physical three-dimensional locations of various points on the vehicle 6B, including points visible in the image data acquired by both of the cameras 14A, 14B as well as points only visible in the image data acquired by one of the cameras 14A, 14B. For example, the computer system 20 can perform actions 104, 106, 108, and 110 of the process 100 shown in FIG. 2. In various applications, one or more conditions or objects may be present in the image data, which would confuse the computer system 20 in calculating measurements from a single frame of image data. For example, such conditions or objects can include flapping tarpaulins, blowing debris, a bird 7 (FIG. 5A), and/or the like. In an embodiment, the computer system 20 can determine that such conditions or objects do not have a commonality of movement or presentation with a target vehicle 6B using any video processing solution, and therefore separate such conditions or objects from analysis of the vehicle 6B.

During operation of the system 50, the computer system 20 can operate the cameras 14A-14D to concurrently acquire image data of the roadway 5. For example, the computer system 20 can start or stop the operation of cameras 14A-14D based on the presence of vehicles 6A-6D approaching the relevant region of the roadway 5. In an embodiment, the computer system 20 can only trigger operation of the cameras 14A-14D in response to a preliminary determination of one or more sufficiently large vehicles 6A-6D approaching on the roadway 5. The computer system 20 can make such a preliminary determination using any solution (e.g., preliminary blob tracking from video acquired by a single video camera).

In any event, the computer system 20 can receive the image data acquired by the cameras 14A-14D and analyze the image data to evaluate the vehicles 6A-6D for any alert conditions. For example, the computer system 20 can determine whether any of the vehicles 6A-6D exceeds a size limit (e.g., in action 114 of FIG. 2). In response to determining that an alert condition is present, the computer system 20 can generate and transmit an alert signal, which can be provided for processing by another system (e.g., in action 116 of FIG. 2). For example, the computer system 20 can provide the alert signal to another computer system (e.g., the user 12 shown in FIG. 1), which can generate a warning to the driver of the vehicle, e.g., via a roadside alert sign, a klaxon, and/or the like. Alternatively, the computer system 20 can generate the warning via a direct connection with the corresponding output device. Furthermore, the computer system 20 can provide the alert signal to another computer system (e.g., the user 12) located at a remote monitoring location, a local first responder, and/or the like, which can initiate a response from other parties to address the alert.

The computer system 20 also can generate alert signals in response to other types of alert conditions. For example, the computer system 20 can generate an alert in response to other conditions that may be detected during the image processing, such as the presence of debris on the roadway, and/or the like. Similarly, the computer system 20 can generate an alert signal in response to a malfunctioning camera or failure of a camera, an inability to acquire useful image data from a camera for an extended period of time (e.g., due to an obstruction, an altered field of view, and/or the like), damage to one or more components of the system 50, and/or the like.

An embodiment provides a system 50 capable of performing metrological operations on vehicles 6A-6D with a sufficient accuracy to generate alerts without issuing excessive false alerts and/or failing to recognize alert conditions. For the video-based stereo imaging-based metrology described herein, the computer system 20 can be configured to successfully address a challenge related to a minimum difference (referred to as "disparity") in pixels between two images concurrently acquired by the cameras 14A, 14B due to the separation between the cameras 14A, 14B. This disparity is inversely related to a distance from the cameras 14A, 14B according to the formula:

$$Z = bf/xD,$$

where Z is the line of sight distance between the cameras 14A, 14B and the object point, D is the measured disparity (horizontal distance between corresponding points), b is the separation between the cameras 14A, 14B, f is the focal length of the lens of the cameras 14A, 14B (e.g., in millimeters), and x is the pixel size in the cameras 14A, 14B (e.g., in millimeters/pixel).

In an embodiment of the system 50, for each pair of cameras 14A, 14B, f, x, and b remain constant. In this case, only Z and D can reasonably vary in the setting, and these values inversely related. As a result, as the range increases, the pixel separation goes to zero. To this extent, increased resolution in the location of the matched points is required as the range increases. For applications in which a single image pair is available, the computer system 20 can determine the disparity value to an extreme accuracy. However, such accuracy comes at considerable expense in terms of the required computing power, and may require multiple approaches to achieve sub-pixel accuracy in estimation.

In another embodiment, the computer system 20 can implement a solution, which utilizes only portions of the image data having a predetermined minimum resolution to perform metrological operations having a target accuracy. For example, the computer system 20 can utilize only the nearer, higher resolution portions of the image data to perform metrological operations having sufficient accuracy with respect to the dimensions of a vehicle 6B in real time. In particular, objects present in the foreground of image data, closest to the cameras 14A, 14B, can have a minimum resolution requirement on disparity for a target accuracy requirement. To this extent, the computer system 20 can employ a sequence of several frames of image data to evaluate the passing vehicle 6B only from foreground pieces of the image data, where the disparity resolution requirement is lowest.

In an embodiment, the computer system 20 continually determines the physical location of the points using currently available image data (e.g., in action 110 of FIG. 2), and updates the physical locations and/or one or more attributes of the object (e.g., in action 112 of FIG. 2) once image data having a higher resolution is available. In an embodiment, the computer system 20 can refrain from determining whether any action is required (e.g., in action 114 of FIG. 2) until the attribute(s) have been evaluated using physical location data determined using image data having a minimum target resolution. In this manner, the computer system 20 can continually improve the accuracy of the physical location data (and therefore the attributes of the object) and only initiate actions when a sufficiently high degree of accuracy in the attributes, and therefore the evaluation, is attained.

Figure 6:
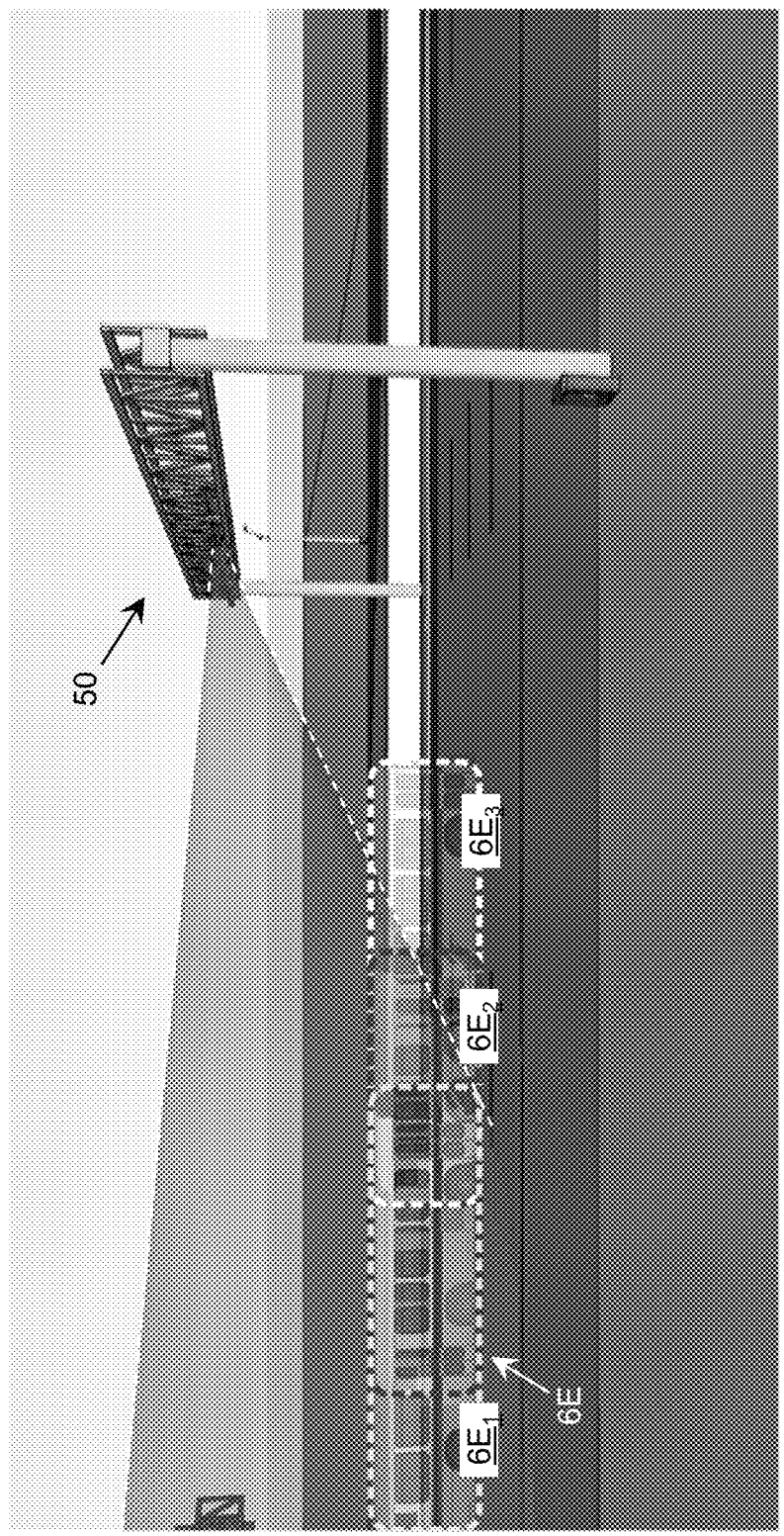
FIG. 6 shows a side view of the system and a vehicle passing thereby according to an embodiment.

FIG. 6 shows a side view of the system 50 and a vehicle 6E passing thereby according to an embodiment. The vehicle 6E is shown at three locations, $6E_1$, $6E_2$, $6E_3$, as it moves through the fields of view of the cameras 14A, 14B (FIG. 5A). At vehicle location $6E_1$, the vehicle 6E is just entering into a near portion of the fields of view of the cameras 14A, 14B. The computer system 20 can process image data acquired at location $6E_1$ to perform metrological operations on the front portion of the vehicle 6E, for which high resolution image data is available. At vehicle location $6E_2$, the front of the vehicle 6E is exiting the fields of view, but the cameras 14A, 14B now acquire high resolution image data for the central portion of the vehicle 6E, which the computer system 20 can process to perform metrological operations on the central portion of the vehicle 6E. Similarly, at vehicle location $6E_3$, the front and central portions of the vehicle 6E have exited or are exiting the fields of view, but the cameras 14A, 14B now acquire high resolution image data for the rear portion of the vehicle 6E, which the computer system 20 can process to perform metrological operations on the rear portion of the vehicle 6E.

By utilizing only the high resolution portions of the image data acquired at each vehicle location $6E_{1-3}$, the computer system 20 can construct high-resolution stereo image data for the vehicle 6E, which suffers minimally from variation of resolution over distance. The computer system 20 can use the constructed image data to perform an accurate measurement of one or more dimensions of the vehicle 6E without requiring sub-pixel calculations. The registration and "stitching" of such image data (either overtly or merely as part of the internal calculations) by the computer system 20 can require vastly less processing resources than the complex processing utilized to achieve sub-pixel estimations. Because of this, the computer system 20 can use such a moving video approach to generate highly accurate measurement data of its targets (e.g., vehicle 6E) in real-time.

To do both registration and measurement, the computer system 20 must accurately recognize the same target in different frames of video. To this extent, the computer system 20 can define and track "blobs" in the image data using any solution. Furthermore, the computer system 20 can use any solution to precisely identify reference points on the object in order to perform metrological operations on the target (e.g., the vehicle 6E). However, current approaches for reliably and precisely matching features of a tracked object can require significant processing. To this extent, in an embodiment, the computer system 20 implements an improved solution for matching features of a tracked object to enable the computer system 20 to perform real time metrological operations on the tracked object, such as the vehicle 6E.

For example, the computer system 20 can use an easily recognized, common feature among the targets to constrain the search space within the image data. For example, when tracking vehicles, such as the vehicle 6E, the computer system 20 can use the fact that virtually all commercial vehicles 6E have shapes which can be generally described as assemblages of rectangular or semi-rectangular solids. To this extent, the vehicles 6E of interest will be generally defined by particular patterns and separations of edges and corners. In an embodiment, the computer system 20 can utilize any combination of one or more highly efficient and quick edge and corner detector solutions capable of finding corners which are not just at right angles but up to any reasonable angle of intersection, to process the image data and identify relevant locations on the vehicles 6E. However, it is understood that embodiments are not limited to edge and corner detection, and can detect any correspondence point of an object of interest. To this extent, in other embodiments, the computer system 20 can be configured to detect any type of correspondence point using any solution. A desired solution can be selected based on one or more attributes of the target objects and the application. Other illustrative feature detection approaches, which can be utilized in embodiments include feature detection using one or more of: Haar-like features; histogram of oriented gradients (HOG); scale-invariant feature transform (SIFT); binary robust invariant scalable keypoints (BRISK); maximally stable extremal regions (MSER); etc.

Figure 7A:
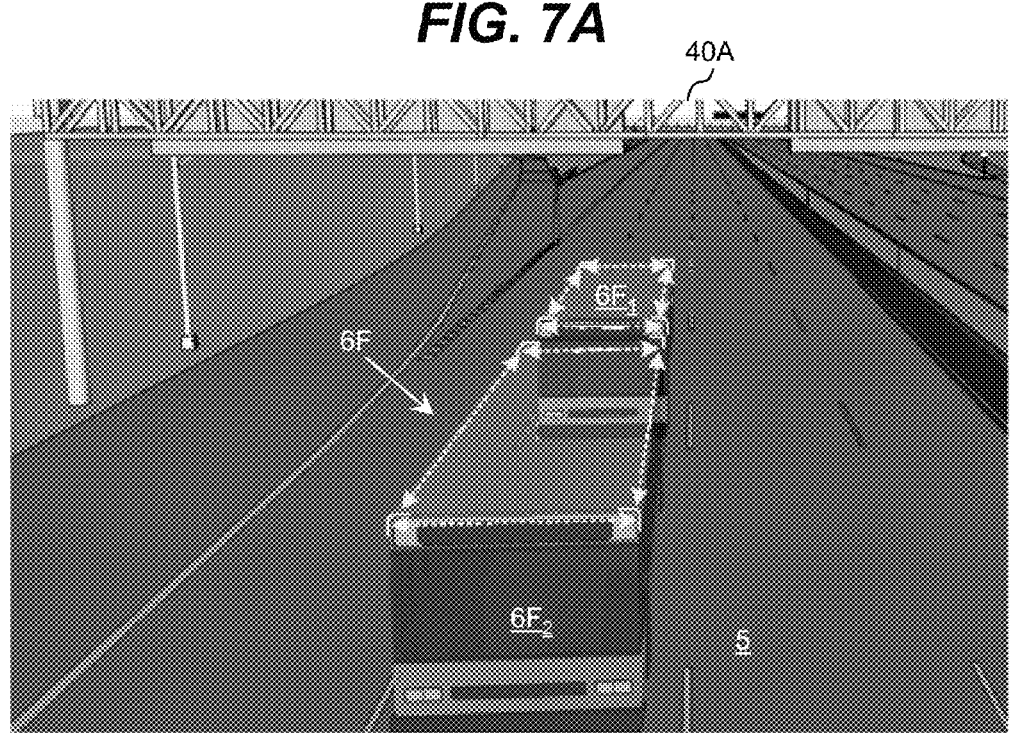
FIGS. 7A and 7B illustrate edge and corner detection in image data according to an embodiment.
Figure 7B:
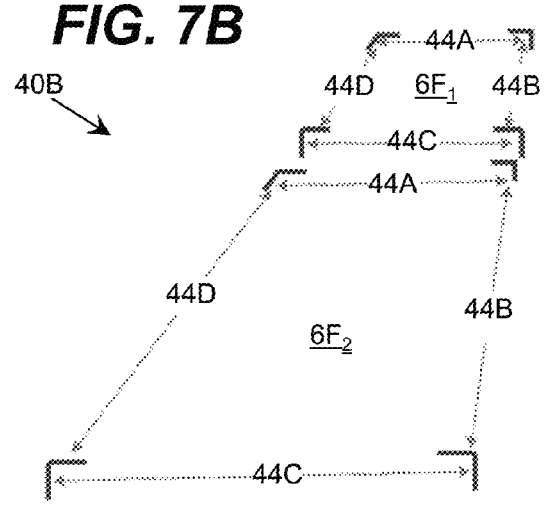

FIGS. 7A and 7B illustrate edge and corner detection in image data 40A, which can be implemented by the computer system 20 (FIG. 1), according to an embodiment. FIG. 7A shows illustrative image data 40A as a simulated compilation of two images acquired by a camera, such as camera 14A (FIG. 1), as a vehicle 6F traveled thereby. To this extent, the vehicle 6F is shown as being imaged in two locations $6F_1$, $6F_2$, as it travels along a designated lane of travel on a roadway 5. After receiving the image data acquired when the vehicle 6F was located at a location $6F_1$, $6F_2$, the computer system 20 can analyze the image data and identify the four corners of the top surface of the vehicle 6F using any solution. FIG. 7B shows the extracted corners for each location $6F_1$, $6F_2$ for clarity, which the computer system 20 can store a metrology data 40B.

In an embodiment, the computer system 20 can derive various measurements 44A-44D of the vehicle 6F using the extracted corners at each location $6F_1$, $6F_2$, which the computer system 20 can store as metrology data 40B using any solution. For example, as illustrated, the measurements 44A-44D can correspond to a perimeter of the top surface of the vehicle 6F. In an embodiment, the measurements 44A-44D are derived using stereo image data as described herein.

As the vehicle 6F has fixed dimensions, the measurements 44A-44D derived by the computer system 20 will remain very similar as the vehicle is imaged in multiple locations $6F_1$, $6F_2$ as it travels through the field of view. The computer system 20 can use a particular pattern of corners for a vehicle 6F and the measurements 44A-44D to quickly and reliably track a specific individual vehicle 6F as it is moving through the field of view. Such tracking allows the computer system 20 to update an accuracy of the measurements (e.g., by refining the measurements using the higher resolution image data) and allows the computer system 20 to stitch together the image data acquired at different locations $6F_1$, $6F_2$ to increase the accuracy of the measurements of all dimensions of the vehicle 6F. Still further, the tracking allows the computer system 20 to perform enhanced stereo image processing described herein to accurately measure one or more points on the vehicle 6F that are only visible in the image data acquired by one of the two cameras.

It is understood that the vehicular metrology application and the corresponding metrological algorithms described herein are only illustrative and the teachings of the invention are equally applicable to other applications and/or the utilization of other metrological algorithms.

For example, in another embodiment, a stereo-imaging based metrology system is configured to evaluate rail vehicles traveling along a set of tracks. Frequently, such rail vehicles are transporting loads that are near the maximum width and/or height to pass through a tunnel or over a narrow bridge. If such a load shifts by even a small amount, the load may project too far in one direction or another. A load striking the tunnel or bridge can lead to numerous problems, including: damage to the load; damage to the bridge/tunnel; derailment of the train; and/or the like. Additionally, for some types of loads, such as aircraft fuselages, even minor damage occurring in transit may render the load unusable or require significant expense to repair at the destination.

To this extent, an embodiment of the stereo-imaging based metrology system described herein provides a cost-effective solution for performing metrological operations on the rail vehicles of a passing train as it approaches a restricted-space region, and initiating some action (e.g., generating a warning for the train operator) in response to determining a presence of an alert condition.

Furthermore, an embodiment of the stereo-imaging based metrology system described herein can recognize and accurately evaluate features on large, delicate cargoes being transported in a rail vehicle, by a truck, and/or the like. In particular, the stereo-imaging based metrology described herein can perform metrological operations on a profile of a load visible in the image data to determine whether there was any change in the profile. To this extent, such a system can include multiple stereo-imaging based metrology locations, such as one at a yard where the load is departing or prior to a load passing through a restricted space area, and another located at a location after the load has traveled some distance, such as at the destination of the load or after the load has passed through the restricted space area. In this case, the computer system 20 can use metrology data 40 (FIG. 1) corresponding to the load at an earlier point in its transport for comparison with metrology data 40 corresponding to the load at a later point in its transport (e.g., after passage through a restricted space area) to evaluate a presence of an alert condition and initiate action, if required. Use of the stereo-imaging based metrology system described herein for such an application can improve an accuracy of the metrology data 40. In a more specific embodiment, the computer system 20 can generate metrology data 40 that includes a relief profile of an area of the load. The computer system 20 can use the relief profile to, for example, distinguish between a dent showing as a shadow and a darker smudge of dirt, and/or the like.

It is understood that the stereo-imaging based metrology system described herein can be utilized to evaluate other types of vehicles. For example, an embodiment can include cameras located on or near a bridge structure to evaluate the size of ships and boats approaching the bridge to travel thereunder. By accurately measuring a height of the ship/boat in three-dimensional space, the computer system 20

(FIG. 1) can determine whether the ship/boat is in danger of striking the bridge and, if so, initiate an alert and/or other action in response thereto.

While height and width are two illustrative metrological measurements that the computer system 20 can perform, it is understood that these measurements are only illustrative of various types of metrological measurements that may be utilized in various applications. For example, the computer system 20 can use stereo-imaging based metrology to accurately measure a speed at which an object is traveling, a direction the object is traveling, and/or the like. Additionally, while many of the applications described herein utilize cameras located at a fixed location, it is understood that applications utilizing cameras located on a moving object are also possible. For example, a stereo-imaging based metrology system can be located on a vehicle to accurately measure the dimensions of an approaching tunnel, underpass, and/or the like, and compare the measurements with one or more required dimensions for safe passage of the vehicle.

It is understood that embodiments also can be directed to non-vehicular applications. For example, in industrial manufacturing, a manufacturing process may be pushed to its limits in order to manufacture a new product. Such a situation can place extra physical strain on the manufacturing system as well as lead to unforeseen problems that require extraordinary measures to address. In an embodiment, a stereo-imaging based metrology system is utilized to provide extremely accurate metrology data 40 (FIG. 1) of a product being manufactured. The metrology data 40 can be utilized to confirm the suitability of the product for its intended use.

In a more particular example, the fabrication of a large-scale gun barrel for a main battle tank, or the like, requires steps in which the barrel is machined to an extremely high degree of precision. In general, the barrel is so heavy and long that strains on the machinery used to manufacture the barrel can cause a bend in the supporting structure, which can lead to the barrel flexing or the machinery moving in a manner that affects the precise positioning of the machining tools. Such flexing or movement can negatively impact the ultimate result of the machining, and result in a gun barrel that is not absolutely true and symmetrical, and therefore at risk for catastrophic failure.

In an embodiment, a stereo-imaging based metrology system is utilized to track the alignment and precision of a product being manufactured. Using the gun barrel as an illustrative product, current approaches use a "shadowgraph," which is generated by precise lighting combined with a high-resolution linear array. The shadowed area of the linear array gives an extremely accurate measurement for the width of the barrel. A pair of shadowgraphs can give the height and width of the gun barrel. An embodiment of the stereo-imaging based metrology system can replace the use of the shadowgraph, while providing metrology data 40 (FIG. 1) being at least as accurate, if not more accurate, than the shadowgraph approach currently utilized.

Figure 8:
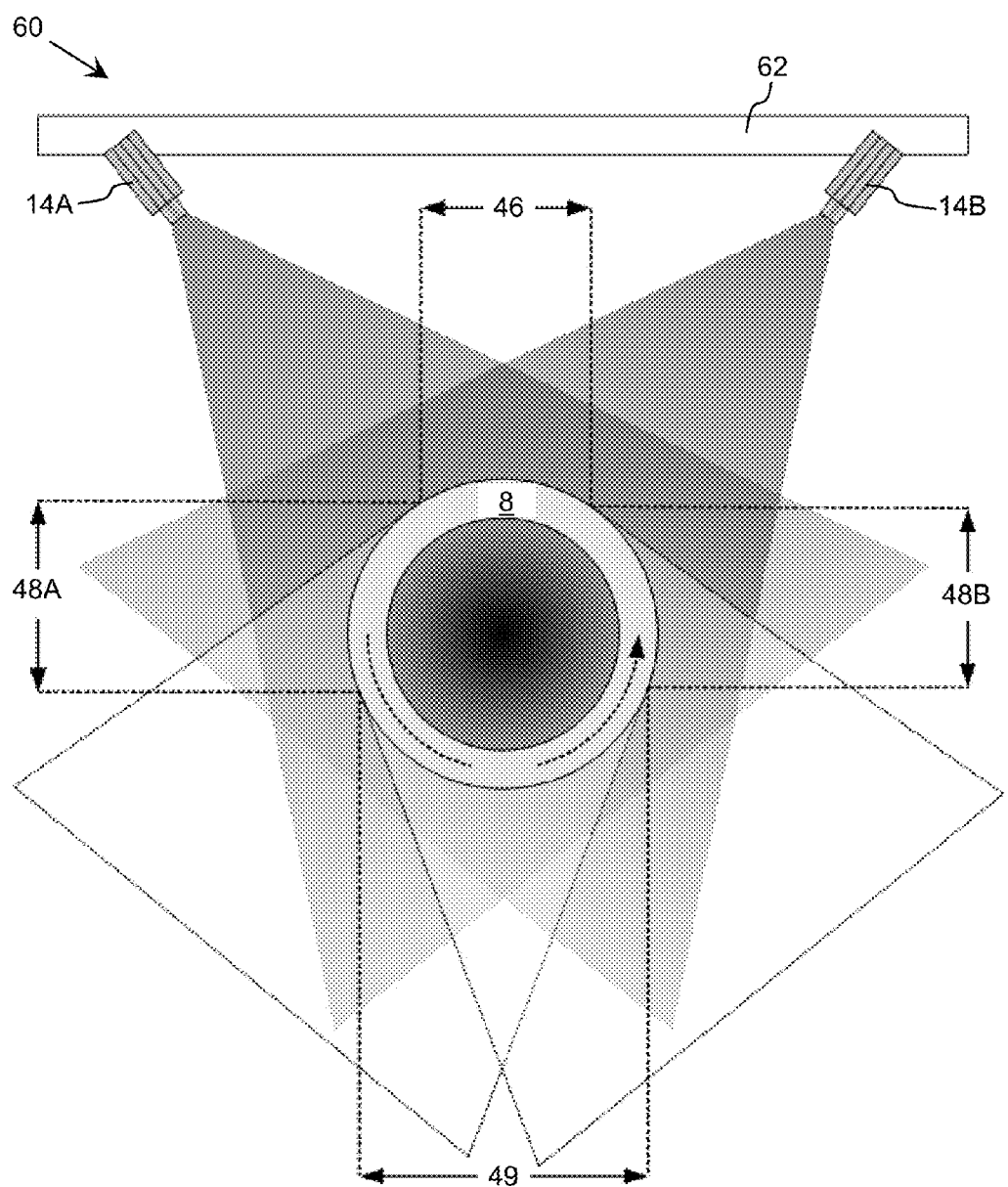
FIG. 8 shows an illustrative machining environment according to an embodiment.

FIG. 8 shows an illustrative machining environment 60 according to an embodiment. The environment 60 includes a pair of cameras 14A, 14B, which are mounted to a support structure 62 using any solution. The support structure 62 can hold the cameras 14A, 14B above a machining setup carrying a product (e.g., a gun barrel) 8 being manufactured. The cameras 14A, 14B have fields of view, which overlap in a region partially defined by a portion 46 of the outer surface of the product 8. Additionally, the field of view of each camera 14A, 14B acquires image data for another portion 48A, 48B, respectively, of the outer surface of the product 8, which is not within the field of view of the other camera 14B, 14A.

Using the stereo-imaging based metrology solution described herein, a computer system 20 (FIG. 1) can receive image data concurrently acquired by the cameras 14A, 14B and process the image data to generate metrology data 40 (FIG. 1) for the outer portions 46, 48A, 48B of the product 8. While the portion 49 of the outer surface of the product 8 is shown as not being imaged, it is understood that this portion 49 of the product 8 can be imaged through the utilization of two additional cameras and/or by the product 8 being rotated during manufacture, which will allow all outer portions of the product to be imaged by one or both of the cameras 14A, 14B. As the fields of view of the cameras 14A, 14B will extend over some lateral portion of the product 8, the computer system 20 can process the image data concurrently acquired by the cameras 14A, 14B to, for example, note flaws in the product 8, verify the rotation and/or progression of the component 8, and/or the like.

While shown and described herein as a method and system for performing stereo imaging-based metrology, it is understood that aspects of the invention further provide various alternative embodiments. For example, in one embodiment, the invention provides a computer program fixed in at least one computer-readable medium, which when executed, enables a computer system to perform stereo imaging-based metrology described herein. To this extent, the computer-readable medium includes program code, such as the metrology program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the metrology program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for performing stereo imaging-based metrology. In this case, the generating can include configuring a computer system, such as the computer system 20 (FIG. 1), to implement a method of performing stereo imaging-based metrology described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of evaluating an object, the method comprising:
for each of at least three different instants:
concurrently acquiring first image data of the object using a first camera and second image data of the object using a second camera;
a computer system processing the first and second image data to identify a shared point of the object visible in both the first and second image data; and
the computer system calculating a physical three-dimensional location of the identified shared point using the first and second image data;
the computer system calculating a physical three-dimensional location of an exclusive point of the object visible only in one of the first or second image data for each of the three different instants using the one of the first or second image data and the physical three-dimensional location of the shared point at each of the three different instants; and
the computer system evaluating the object using the physical three-dimensional locations of the shared point and the exclusive point.

2. The method of claim 1, further comprising, in response to the evaluating indicating an alert condition, the computer system providing an alert signal for use in warning at least one individual associated with at least one of: the object or an area in which the object is located.

3. The method of claim 1, wherein the object is a vehicle approaching a location of the first and second cameras and wherein the evaluating includes the computer system measuring a plurality of dimensions of the vehicle using calculated physical three-dimensional locations of a plurality of shared points and at least one exclusive point.

4. The method of claim 3, wherein the evaluating includes:
the computer system determining whether at least one of the measured plurality of dimensions is within an acceptable range of dimensions for vehicles approaching a restricted-space region; and
the computer system providing an alert signal for use in warning at least one individual associated with the vehicle in response to the determining indicating at least one of the measured plurality of dimensions is outside of the acceptable range of dimensions, prior to the vehicle reaching the restricted-space region.

5. The method of claim 4, wherein the first and second cameras are located above a path of travel of the vehicle and are configured to acquire image data from opposing sides of the vehicle as the vehicle approaches the location of the first and second cameras.

6. The method of claim 3, wherein the computer system measuring the plurality of dimensions of the vehicle includes the computer system processing a sequence of a plurality of concurrently acquired stereo image data and updating a measurement for at least one of the plurality of dimensions when the stereo image data includes stereo image data for a corresponding portion of the vehicle having a predetermined minimum resolution.

7. The method of claim 1, wherein the identifying a shared point of the object includes identifying a corner of the object visible in the first and second image data.

8. The method of claim 7, wherein the computer system tracks the object over image data acquired at different instants by identifying a plurality of corners on the object in image data acquired at an instant and comparing dimensions corresponding to the plurality of corners with dimensions corresponding to at least one object in image data acquired at a previous instant.

9. A system comprising:
a computer system for evaluating an object by performing a method comprising:
obtaining image data including the object acquired at a plurality of instants, wherein the image data includes first image data and second image data concurrently acquired by a first camera and a second camera;
for image data corresponding to at least three of the plurality of instants:
processing the first and second image data to identify a shared point of the object visible in both the first and second image data; and
calculating a physical three-dimensional location of the identified shared point using the first and second image data;
calculating a physical three-dimensional location of an exclusive point of the object visible only in one of the first or second image data for each of the three different instants using the one of the first or second image data and the physical three-dimensional location of the shared point at each of the three different instants; and
evaluating the object using the physical three-dimensional locations of the shared point and the exclusive point.

10. The system of claim 9, further comprising the first camera and the second camera, wherein the method further includes operating the first camera and the second camera to concurrently acquire the image data.

11. The system of claim 9, further comprising a second computer system for processing an alert, wherein the method further comprises, in response to the evaluating indicating an alert condition, the computer system providing an alert signal for processing by the second computer system to warn at least one individual associated with at least one of: the object or an area in which the object is located.

12. The system of claim 11, wherein the object is a vehicle approaching a restricted-space region and the second computer system generates a warning to a driver of the vehicle in response to receiving the alert signal.

13. The system of claim 9, wherein the evaluating includes measuring a plurality of dimensions of the object using calculated physical three-dimensional locations of a plurality of shared points and at least one exclusive point.

14. The system of claim 13, wherein the measuring the plurality of dimensions of the object includes processing a sequence of a plurality of concurrently acquired stereo image data and updating a measurement for at least one of the plurality of dimensions when the stereo image data includes stereo image data for a corresponding portion of the object having a predetermined minimum resolution.

15. A vehicle evaluation system comprising:
a first camera and a second camera located over a path of travel for the vehicle with fields of view configured to capture image data including the front and top of the vehicle in both fields of view and each side of the vehicle in only one of the fields of view as the vehicle approaches the first and second cameras; and
a computer system for evaluating the vehicle as it approaches a restricted-space region by performing a method comprising:
obtaining image data including first image data and second image data of the vehicle concurrently acquired at a plurality of instants as the vehicle is approaching the first and second cameras;
for image data corresponding to at least three of the plurality of instants:
processing the first and second image data to identify a shared point of the vehicle visible in both the first and second image data; and
calculating a physical three-dimensional location of the identified shared point using the first and second image data;
calculating a physical three-dimensional location of an exclusive point of the vehicle visible only in one of the first or second image data for each of the three different instants using the one of the first or second image data and the physical three-dimensional location of the shared point at each of the three different instants; and
evaluating the vehicle for passage through the restricted-space region using the physical three-dimensional locations of the shared point and the exclusive point.

16. The system of claim 15, wherein the evaluating includes measuring a plurality of dimensions of each of: the vehicle and a load at least partially visible being carried by the vehicle using calculated physical three-dimensional locations of a plurality of shared points and at least one exclusive point.

17. The system of claim 16, further comprising a third camera and a fourth camera located over a path of travel for the vehicle after the restricted-space region, wherein the third and fourth cameras have fields of view configured to capture image data including the front and top of the vehicle in both fields of view and each side of the vehicle in only one of the fields of view as the vehicle approaches the first and second cameras, and wherein the computer system further evaluates the load using image data concurrently acquired by the third and fourth cameras and the plurality of dimensions measured before the vehicle traveled through the restricted-space region.

18. The system of claim 15, the method further comprising providing an alert signal for use in warning at least one individual associated with the vehicle in response to the evaluating indicating the vehicle is not suitable for passage through the restricted-space region, prior to the vehicle reaching the restricted-space region.

19. The system of claim 18, further comprising a second computer system for processing the alert signal to warn at least one individual associated with at least one of: the vehicle or the restricted-space region.

20. The system of claim 19, wherein the second computer system generates a warning to a driver of the vehicle in response to receiving the alert signal.

* * * * *